(Model.)

J. F. WELCH.
WORM GEAR.

No. 486,204.          Patented Nov. 15, 1892.

Witnesses:—          Inventor:—
James F. Welch
by attorneys
Brown & Seward

UNITED STATES PATENT OFFICE.

JAMES F. WELCH, OF BROOKLYN, NEW YORK, ASSIGNOR TO THE GLEN COVE MACHINE COMPANY, LIMITED, OF SAME PLACE.

WORM-GEAR.

SPECIFICATION forming part of Letters Patent No. 486,204, dated November 15, 1892.

Application filed February 18, 1892. Serial No. 421,938. (Model.)

*To all whom it may concern:*

Be it known that I, JAMES F. WELCH, of Brooklyn, in the county of Kings and State of New York, have invented a new and useful Improvement in Worm-Gears, of which the following is a specification.

My invention relates to an improvement in worm-gear, with the object in view of obtaining an increased area of contact between the teeth of the worm and gear-wheel.

A practical embodiment of my invention is represented in the accompanying drawings, in which—

Figure 1:
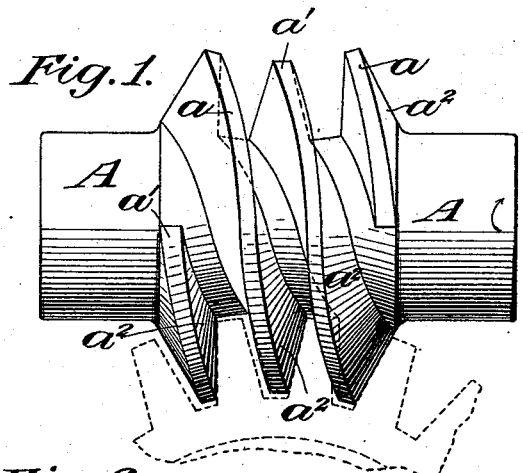
Figure 2:
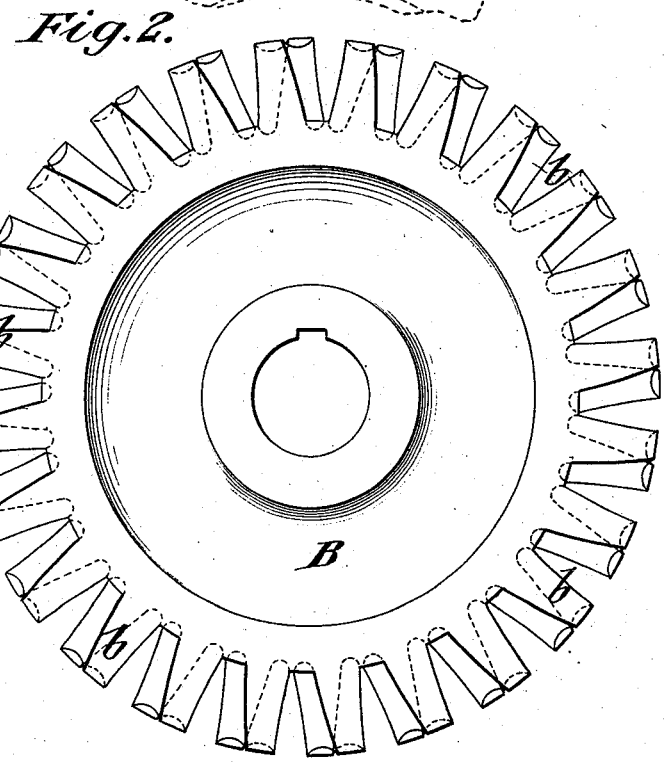
Figure 3:
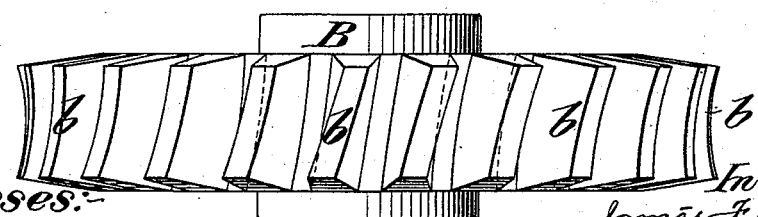

Figure 1 is a view of the worm in side elevation, showing in dotted lines a section of the worm-wheel in engagement therewith. Fig. 2 is a view of the worm-wheel in side elevation, and Fig. 3 is a view of the worm-wheel in edge or face elevation.

The outer faces of the teeth on the worm, taken in a plane extending through the longitudinal axis of the worm, are in the circumference of a circle corresponding to the circumference of the worm-wheel at the base of the teeth in a central plane transversely to its axis, and the faces of the teeth on the worm-wheel are formed on a wind corresponding to the wind of the worm and are concave on a curve corresponding to the curve of the worm-shaft between its teeth, while the bottoms of the spaces between the teeth on the worm-wheel are concave on a curve corresponding to a curve of the faces of the teeth on the worm. The contact sides of the teeth on the worm continuously change their positions relatively to the axis of the worm-shaft throughout their length to conform to the continuously-changing positions of the teeth on the rotating worm-wheel, and the contact sides of the teeth on the worm-wheel have a wind or compound curve corresponding to the sides of the teeth on the worm, having a general oblique direction across the face of the worm-wheel. The worm-shaft is represented by A, and is shown in the present instance as provided with two teeth $a$ and $a'$.

The worm-wheel is represented by B and its teeth by $b$. As the worm-wheel is caused to rotate by the action of the worm, its tooth, with which the worm engages, gradually changes its position relatively to the axis of the worm-shaft, and my present invention provides for such a structure of the worm-tooth that its contact side $a^2$, for example, will adjust itself to such constantly-varying positions of the tooth on the worm-wheel and thereby exert a constant pressure upon such tooth during its travel through a considerable portion of its arc. The teeth $b$ on the worm-wheel have a shape which conforms to the space between two successive teeth of the worm, leaving a little space for clearance.

The method of cutting the teeth upon the worm and worm-wheel and apparatus for doing it form the subject-matter of another application, filed by me, of even date herewith, and are not set forth herein.

What I claim is—

A worm and a worm-wheel, a tooth of the worm being set in a curved plane corresponding to the curve of the circumference of the worm-wheel and having its driving or contact side varied along its length to assume different pitches relative to the axis of the worm and the teeth on the worm-wheel having their contact sides formed in a compound curved plane having a general oblique direction across the face of the wheel to correspond to the face of the worm-tooth, substantially as set forth.

JAMES F. WELCH.

Witnesses:
  FREDK. HAYNES,
  I. B. DECKER.